United States Patent
Freed

(10) Patent No.: US 7,283,797 B1
(45) Date of Patent: Oct. 16, 2007

(54) SYSTEM AND METHOD OF IMPROVING THE DYNAMIC RANGE OF A RECEIVER IN THE PRESENCE OF A NARROWBAND INTERFERING SIGNAL

(75) Inventor: John G. Freed, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/035,944

(22) Filed: Mar. 6, 1998

(51) Int. Cl.
*H04B 1/06* (2006.01)
*H04B 7/00* (2006.01)

(52) U.S. Cl. .............................. 455/245.1; 455/250.1; 455/343

(58) Field of Classification Search ................ 455/334, 455/245.1, 234.1, 250.1, 311, 295, 296, 88, 455/69, 70, 235.2, 254, 234.2, 239.1, 550, 455/570; 375/345; 16/76, 236, 226.1, 226.3, 16/227, 228, 249.1, 266, 283
See application file for complete search history.

(56) References Cited

U.S. PATENT DOCUMENTS

| | | | |
|---|---|---|---|
| 5,359,607 A | | 10/1994 | Nguyen et al. |
| 5,570,373 A | * | 10/1996 | Wing .......................... 455/423 |
| 5,590,411 A | * | 12/1996 | Sroka et al. ................... 455/78 |
| 5,697,081 A | * | 12/1997 | Lyall, Jr. et al. .......... 455/249.1 |
| 5,722,061 A | * | 2/1998 | Hutchison, IV et al. . 455/245.1 |
| 5,722,063 A | * | 2/1998 | Peterzell et al. ............ 455/287 |
| 5,732,341 A | * | 3/1998 | Wheatley, III ........... 455/234.1 |
| 5,758,271 A | * | 5/1998 | Rich et al. ............... 455/234.1 |
| 5,907,798 A | * | 5/1999 | Abramsky et al. ........ 455/259.1 |
| 5,930,692 A | * | 7/1999 | Peterzell et al. ............ 455/217 |
| 6,134,430 A | * | 10/2000 | Younis et al. ................ 455/340 |
| 6,208,849 B1 | * | 3/2001 | Cho et al. ................... 455/296 |
| 6,311,048 B1 | * | 10/2001 | Loke ....................... 455/245.1 |

OTHER PUBLICATIONS

RF Micro-Devices, RF9986, PCS Low Noise Amplifier/Mixer.

* cited by examiner

*Primary Examiner*—Lewis West
(74) *Attorney, Agent, or Firm*—Coats & Bennett, P.L.L.C.

(57) ABSTRACT

An apparatus, system, and method improve the dynamic range of a receiver in the presence of a narrowband interfering signal. An error rate of a received signal is computed, and the input intercept point of a low noise amplifier in the receiver is adjusted based on the error rate. The transmit power level is detected, and the input intercept point is adjusted based also on the transmit power level. The received signal strength is also detected, and the gain of the low noise amplifier is adjusted based on the received signal strength. In this manner, the effect of crossmodulation on the received signal is reduced.

15 Claims, 6 Drawing Sheets

SYSTEM AND METHOD OF IMPROVING THE DYNAMIC RANGE OF A RECEIVER IN THE PRESENCE OF A NARROWBAND INTERFERING SIGNAL

BACKGROUND

This invention relates to an apparatus, system, and method for improving the dynamic range of a receiver. More particularly, this invention relates to an apparatus, system, and method for improving the dynamic range of a receiver in the presence of a narrowband interfering signal.

Duplex radio systems, such as a Code Division Multiple Access (CDMA) duplex radio system, use spread spectrum full duplex transmission to transmit and receive cellular telephone calls. In a CDMA radio system according to the IS-95 standard, information to be transmitted is typically digitized, encoded, and spread over a 1.23 Mega Hertz (MHz) bandwidth. A typical IS-95 subscriber unit transmitter uses Offset Quadrature Phase Shift Keying (OQPSK) modulation which contains both time varying phase and amplitude components. Thus, the transmitter output has an amplitude modulation (AM) component and is not a constant envelope signal. A CDMA base station uses Quadrature Phase Shift Keying (QPSK) modulation with both time-varying phase and amplitude components. At the receiving end, the wideband spread signal is despread, decoded, and converted back into analog form. Frequency selective filters, referred to as duplexors, are used in the subscriber unit to combine the transmit and receive signals together to permit simultaneous transmit and receiver operation.

FIG. 1 illustrates a conventional subscriber unit duplex system. The system includes a transmit (TX) path and a receive (RX) path. The TX path includes a Driver 110 for amplifying an OQPSK modulated signal, a TX Filter 120 for filtering the modulated signal, and a Power Amplifier (PA) 130 for amplifying the filtered signal for transmission. The signal is filtered by a Duplexor 140 and transmitted to a base station via an Antenna 145. A signal is received from the base station via the Antenna 145 and filtered by the Duplexor 140. Because the Duplexor isolation is not infinite, a portion, $P_{TX-RX}$, of the transmit signal appears at the receiver input when the transmitter is turned on. The received signal is amplified by an RX Low Noise Amplifier (LNA) 150, filtered by an RX Filter 160, and mixed with a local oscillator (LO) frequency in a Mixer 170. The received signal is then fed, for example, to an IF filter.

As CDMA systems are deployed into systems using the current Advanced Mobile Phone System (AMPS) cellular telephone band, a potential source of interference exists between the wideband spread spectrum signal transmitted by an IS-95 subscriber unit and the relatively narrowband AMPS signal coexisting in the same frequency band. If an AMPS signal, or any narrowband signal, is present within the RF passband of the receiver when the transmitter is on, the AM component of the transmit signal is transferred onto the narrowband signal, due to third order nonlinearity in the LNA 150. This effect, which is referred to as crossmodulation, is well known in amplitude modulation systems.

Because the bandwidth of a CDMA transmit signal is relatively large (1.23 MHz), it is possible for this wideband TX crossmodulation signal to appear in the IF passband of the desired receive signal, depending on where the narrowband interfering signal is located with respect to the desired RX channel. In fact, for any narrowband interfering signal having a center frequency closer to the RX center frequency than the TX spread bandwidth plus half the RX channel bandwidth, the TX crossmodulation product falls in the IF bandwidth. In an AMPS/CDMA system, this means that any narrowband interfering signal having a center frequency within approximately 1.85 MHz of the RX center frequency creates undesired TX modulation within the RX IF passband. The net effect of this crossmodulation product is to mask the desired receive signal, thus reducing the sensitivity of the receiver. This effect is illustrated in FIGS. 2A and 2B.

FIG. 2A illustrates a TX modulated signal. FIG. 2B illustrates the TX modulated signal transferred onto a narrowband interfering signal. As can be seen from the shading in FIG. 2B, the TX crossmodulation falls within the desired RX bandwidth, masking the desired receive signal and reducing the dynamic range of the receiver by effectively increasing the noise floor of the receiver.

This effect can also occur in the Mixer 170 illustrated in FIG. 1. However, the attenuation of the RX Filter 160 and the Mixer 170's third order input intercept point can be selected to suppress the TX signal enough so that the Mixer 170 does not contribute any appreciable additional crossmodulation product.

The level of TX modulation appearing about the narrowband interfering signal varies linearly with the level of the narrowband interfering signal and the modulation index of the TX modulation (% modulation), the square of the amplitude of the TX signal appearing at the LNA input ($P_{TX-RX}$ in FIG. 1), and inversely as the square of the third order input intercept point of the LNA 150. Thus, the factors that contribute to the crossmodulation product are the amplitudes of the TX signal and the narrowband interfering signal, the modulation index of the TX signal, and the third order input intercept point of the LNA 150.

Of the factors contributing to the generation of the undesired crossmodulation products, the modulation index is fixed by the system and cannot be changed. The amplitude of the TX signal appearing at the LNA input can be reduced by specifying more TX-RX attenuation in the Duplexor 140. However, in a small subscriber unit, the practical limit of isolation that can be achieved is not sufficient to eliminate the generation of the crossmodulation product. It is also not practical to reduce the amplitude of the narrowband interfering signal appearing in the RX band, since any attempt to do so would also reduce the level of the desired RX signal.

Conventionally, the third order input intercept point of the LNA 150 is varied to minimize the generation of crossmodulation products. An example of an LNA with a variable third order input intercept point is the RF 9986 integrated circuit produced by RF Micro-Devices. Conventionally, the third order input intercept point of the LNA is set at a maximum level while the transmitter operates at relatively high power and then switched to a minimum level while the transmitter operates at reduced power. This improves the dynamic range of the receiver to some extent and also saves current, since the lower third order input intercept point generally requires less current from the power supply. In addition to controlling the third order input intercept point of the LNA, the gain of the LNA is typically also reduced under strong on-channel signal conditions to help improve receiver dynamic range.

While the conventional approach is effective for many situations, it does not provide adequate dynamic range of the receiver in at least one situation, e.g., when the subscriber unit is operating relatively close to a base station and a narrowband signal appears. In this situation, the subscriber unit transmitter is operating at reduced power, and the LNA's third order input intercept point, which is adjusted depending on the transmit power level, is set at the minimum level. If a strong AMPS signal or other narrowband signal, originating from an AMPS base station co-located with the CDMA base station, an AMPS microcell within the larger CDMA cell, or another source, appears within the +/−1.85 MHz region around the subscriber unit's RX channel, the strong narrowband interfering signal mixes with the subscriber unit TX signal and generates on-channel crossmodulation products. This causes a reduction in RX signal-to-noise ratio and possibly a loss of communications.

Linking the control of the LNA's third order input intercept point to the transmit power level is thus, not alone, sufficient to achieve the optimum dynamic range to deal with narrowband interfering signals that are likely to be encountered in actual system operation.

There is thus a need for method and system for increasing the dynamic range of a receiver in the presence of a narrowband interfering signal which overcomes the drawbacks of the prior art.

SUMMARY

It is therefore an object of the invention to provide an apparatus, system, and method for increasing the dynamic range of a receiver in the presence of a narrowband interfering signal.

According to an exemplary embodiment, an error rate of a received signal is computed, and the input intercept point of a low noise amplifier in the receiver is adjusted based on the error rate. The transmit power level is detected, and the input intercept point is adjusted based also on the transmit power level. If the transmit power level is low, and the computed error rate exceeds a predetermined threshold, the input intercept point is set at a maximum level. If the transmit power level is low, and the computed error rate does not exceed a predetermined threshold, the input intercept point is set at a minimum level. If the transmit power level is high, the input intercept point is set at a maximum level. The received signal strength is also detected, and the gain of the low noise amplifier is adjusted based on the received signal strength.

BRIEF DESCRIPTION OF THE DRAWINGS

Exemplary embodiments of the invention will now be described in more detail with reference to the accompanying drawings, in which like descriptive labels are used to refer to similar elements and in which.

DETAILED DESCRIPTION

In this description, specific details such as particular circuits, circuit components, techniques, etc., are set forth for purposes of explanation and not limitation in order to provide a thorough understanding of the invention. It will be apparent to one of ordinary skill in the art that the invention may be practiced in other embodiments that depart from these specific details. Details of well known methods, devices, and circuits are omitted so as not to obscure the description of the invention.

According to an exemplary embodiment, the dynamic range of a receiver is maximized in the presence of a narrowband interfering signal by adjusting a third order input intercept point of a low noise amplifier in the receiver depending on a computed error rate of a received signal.

Figure 1:
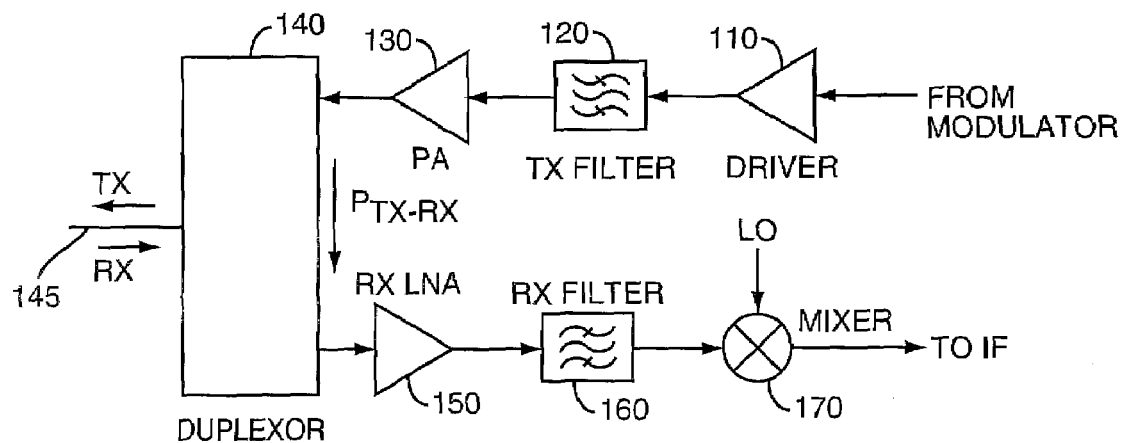
FIG. 1 illustrates a conventional subscriber unit duplex system.
Figure 2:
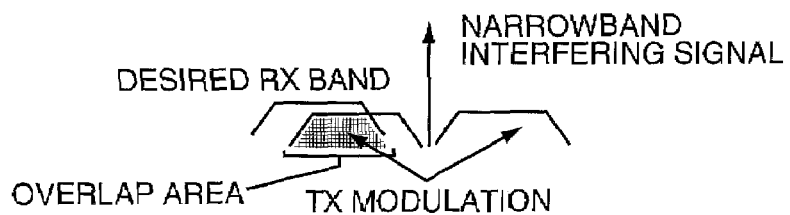
FIG. 2 illustrates a problem with the conventional duplex system.
Figure 3:
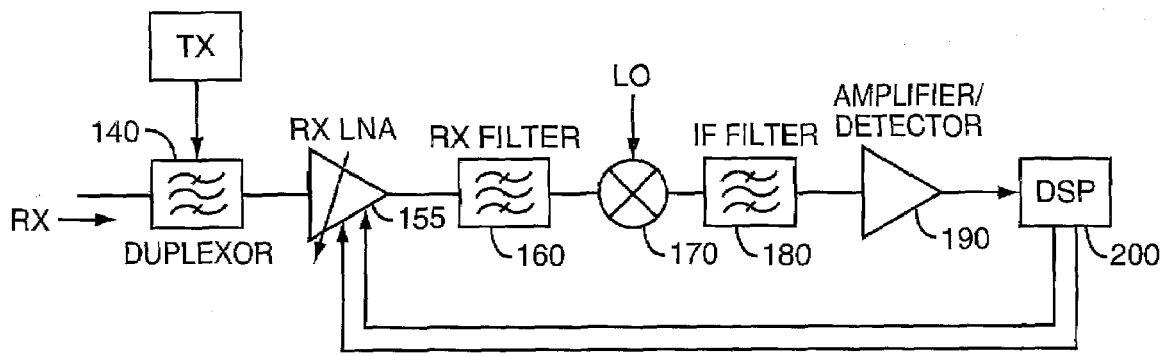
FIG. 3 illustrates the receiver path of a transceiver according to an exemplary embodiment of the present invention.

FIG. 3 illustrates a transceiver according to an exemplary embodiment of the present invention. The transceiver includes a transmitting path 141. It will be appreciated that the receiver path of FIG. 3 can be used in conjunction with any suitable transmitting path 141, such as the transmitting path shown in FIG. 1.

In FIG. 3, the receiving path includes an RX LNA 155, an RX Filter 160, a Mixer 170, an IF Filter 180, and an Amplifier/Detector 190. The RX LNA 155 amplifies signals received from the Duplexor 140. The RX Filter 160 filters the amplified signals to remove noise and suppress spurious effects, the Mixer 170 mixes the filtered signals with a local oscillator frequency, the IF Filter 180 filters the signals to an intermediate frequency, and the Amplifier/Detector 190 amplifies and detects the filtered signals, producing digital baseband data which is processed by the DSP 200.

According to an exemplary embodiment, the third order input intercept point and the gain of the RX LNA 155 are adjustable, depending on the state of operation of the transceiver, to maximize the dynamic range of the receiver.

The third order input intercept point of the RX LNA 155 may be selected based on several factors, e.g., the transmit power level of the system, the received signal strength, etc. According to an exemplary embodiment, the transmit power level is used to adjust the third order intercept point. The transmit power level may be detected in any conventional manner, e.g., by direct measurement of the transmit signal, through inference based on the detected received signal strength, or by referring to a look-up table in the DSP 200. To avoid the problems associated with the prior art, an error rate, such as a bit error rate or frame erasure rate (FER), of the received signal may also be used in the selection of the third input intercept point. For this purpose, the DSP 200 processes the digital baseband data output from the Amplifier/Detector 190 and determines the FER from the checksum within each frame of the digital data in a conventional manner. The DSP 200 may be implemented as, e.g., a programmable microprocessor.

A transceiver according to the IS-95 standard dynamically varies the transmitter power level over approximately an 80 dB range. The DSP 200 determines whether the detected transmit power level is high or low. If the transmit power level is high, e.g., within 10 dB of the upper limit of the transmit power range, the third order intercept point is set to a maximum level. If the transmit power level is low, e.g., more than 10 dBm below maximum power, the DSP 200 determines whether the FER exceeds a predetermined threshold, e.g., ½%. According to an exemplary embodiment, if the FER exceeds the predetermined threshold and the transmit power level is low, the third order input intercept point of the LNA 155 is set to a maximum level. If the transmit power level is low but the FER does not exceed the predetermined threshold, the third order input intercept point is set to a minimum level. In this manner, the dynamic range of the receiver is improved in the presence of a narrowband interfering signal, and current is saved in the receiver.

The gain of the RX LNA 155 may also be selected based on the received signal strength. According to an exemplary embodiment, the received signal strength may be detected in a conventional manner by, e.g., the DSP 200.

The DSP 200 determines whether the detected signal strength exceeds a predetermined threshold. If the received signal strength is below a predetermined threshold, e.g., less than 30 dB above the receiver sensitivity, the gain of the RX LNA 155 is set to a maximum level. If the received signal strength is above the predetermined threshold, e.g., greater than 30 dB above the receiver sensitivity, the gain is set to a minimum level. The DSP 200 adjusts the gain and third order input intercept point of the LNA 155 by transmitting appropriate control signals via, e.g., control lines 210 and 220. Although two control lines are shown in FIG. 3 for illustrative purposes, it will be appreciated that a single control line or more than two control lines may be used for this purpose. The control signals trigger adjustment of the gain and third order input intercept point via, for example, a transistor switch and/or logic in the LNA 155.

The selection of the third order input intercept point and the gain of the LNA 155 varies, depending on the state of operation of the transceiver. The states of operation of the transceiver may be categorized as follows:

State 1

TX operates at high power
RX signal strength below threshold
FER not used
LNA gain maximum
LNA input intercept point maximum State 2

TX operates at reduced power
RX signal strength below threshold
FER below threshold
LNA gain maximum
LNA input intercept point minimum State 3

TX operates at reduced power
RX signal strength above threshold
FER below threshold
LNA gain minimum
LNA input intercept point minimum State 4

TX operates at reduced power
RX signal strength above threshold
FER above threshold
LNA gain minimum
LNA input intercept point maximum State 1 refers to a situation in which the subscriber unit is located, e.g., a long distance from the CDMA base station. In this situation, the transmit power level is high so the LNA third order input intercept point is set at a maximum level, without having to consider the FER rate. Also, the RX signal strength is below the threshold, so the LNA gain is set to a maximum level.

State 2 refers to a situation in which the subscriber unit is, e.g., closer to the CDMA base station. In this situation, the transmit power is low, but the FER is still within acceptable limits, so the LNA third order input intercept point is set at a minimum level. Also, the RX signal strength is below the threshold, so the LNA gain is set to a maximum level.

The FER may increase during State 2, e.g., if the subscriber unit moves close to an AMPS telephone or AMPS microcell. If the FER increases to the point of exceeding the threshold during State 2, the LNA third order input intercept point is adjusted to the maximum level.

State 3 refers to a situation in which the subscriber unit is, e.g., even closer to the CDMA base station. As in State 2, the transmit power level is low, but the FER is still within acceptable limits, so the LNA third order input intercept point is set at a minimum level. However, the RX signal strength is above the threshold, so the LNA gain is set to a minimum level.

As in State 2, the FER may increase during State 3 to such a point that it exceeds the threshold. In this case, the LNA third order input intercept point is adjusted to the maximum level.

State 4 refers to a situation in which the subscriber unit is close to a narrowband base station, e.g., an AMPS base station. In this situation, as in State 3, the RX signal strength is above the threshold, so the LNA gain is set to a minimum level. However, the transmit power level is low, and the FER exceeds the threshold, so the LNA third order input intercept point is set at a maximum level.

According to the present invention, the third order input intercept point of the LNA is increased, in response to an increased FER rate and a reduced transmit power level, to extend the dynamic range of the receiver. Because the undesired TX crossmodulation products vary inversely as the square of the LNA third order input intercept point, a small increase in the third order input intercept point results in a larger decrease in the TX crossmodulation products. For example, a 1 dB increase in the third order input intercept point results in a 2 dB decrease in the TX crossmodulation products. Thus, by increasing the LNA third order input intercept point in response to an FER above a predetermined threshold and a low transmit power level, the level of interfering signal required to degrade the FER is effectively increased, thus optimizing the dynamic range for handling the interfering signal.

Figure 4:
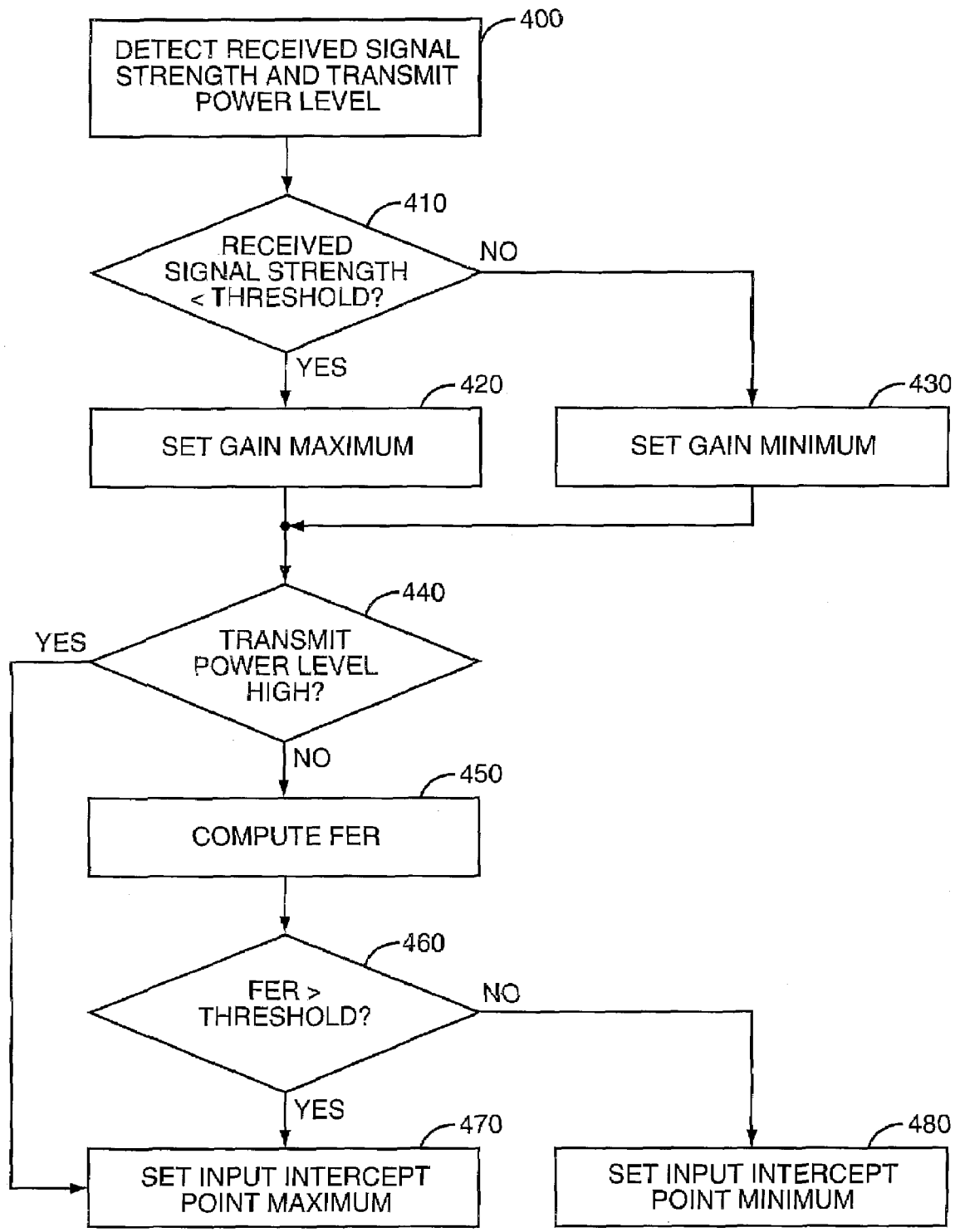
FIG. 4 illustrates a method according to an exemplary embodiment of the present invention.

FIG. 4 illustrates a method for improving the dynamic range of a receiver, according to an exemplary embodiment of the present invention. The method begins at step 400, at which the received signal strength and the transmit power level of the received signal are detected.

At step 410, a determination is made by the DSP 200 whether the received signal strength is below a predetermined threshold. If the received signal strength is below a predetermined threshold, the gain of the LNA 155 is set at a maximum level at step 420. If the received signal strength is not below a predetermined threshold, the gain of the LNA 155 is set at a minimum level at step 430.

At step 440, a determination is made by the DSP 200 whether the transmit power level is high. If the transmit power level is high, the third order input intercept point of the LNA 155 is set at a maximum level at step 470. If the transmit power level is not high, the FER is computed at step 450.

From step 450, the DSP 200 determines whether the FER is greater than a predetermined threshold, e.g., ½%. If the FER is greater than the predetermined threshold, the third order input intercept point is set to a maximum level at step 470. If the FER does not exceed the predetermined threshold, the third order input intercept point is set to a minimum level at step 480. It will be appreciated that the order of the steps 410-430 and steps 440-480 may be interchanged, i.e., the gain may be adjusted before, after, or at the same time as the third order input intercept point.

FIGS. 5A-5D illustrate simulations of a system according to the present invention, in various states of operation. Typical parameters for IS-95 CDMA filters and gain stages were used in the simulations. In addition, the system bandwidth was set at 1250 Kilo Hertz (KHz), the Energy per bit to noise ratio (Eb/No) was set at 4.5 dB, the processing gain was set at 21.07 dB, and the traffic channel offset was set at −15.60 dB.

Figure 5A:
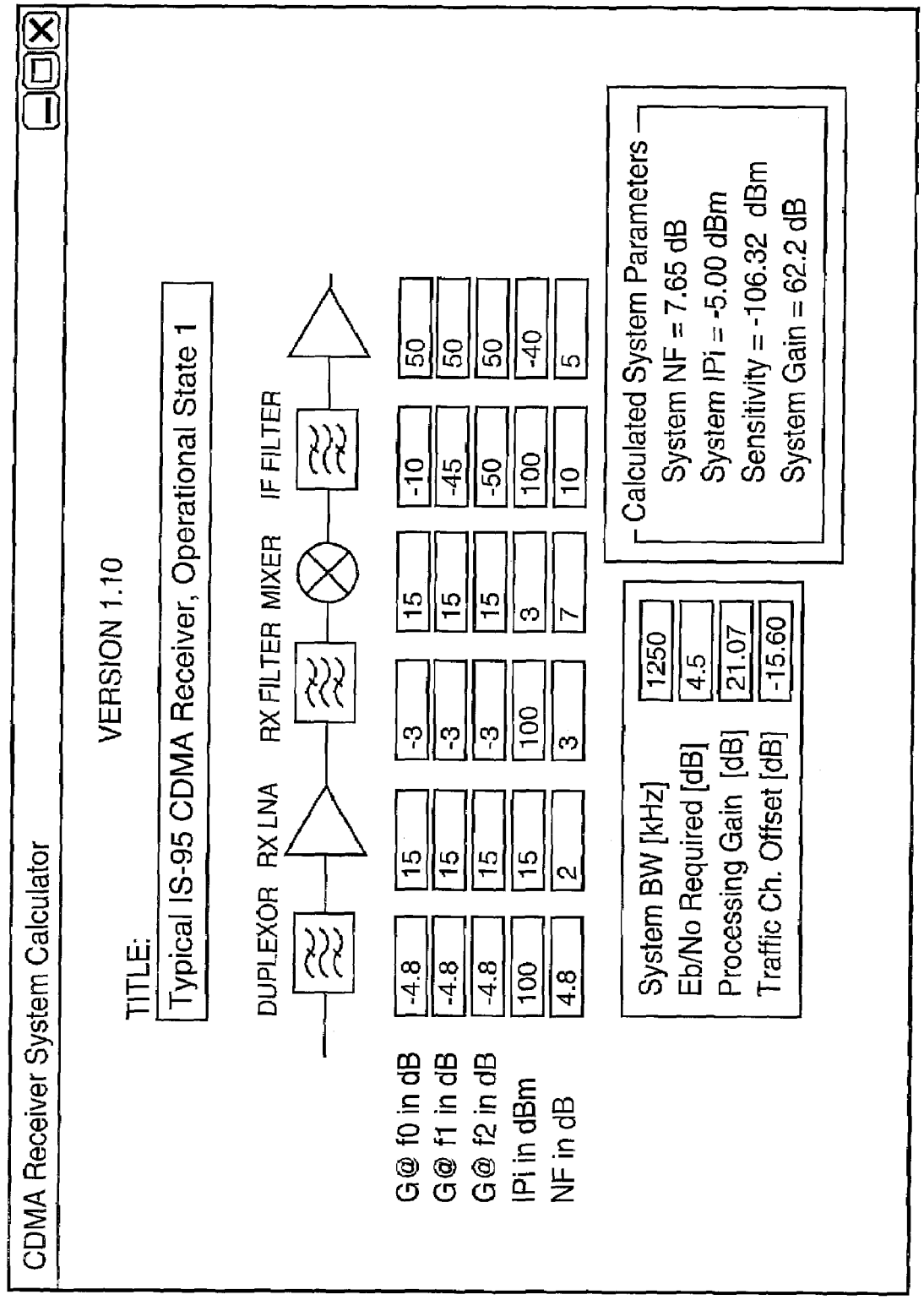
FIGS. 5A-5D illustrate simulations according to an exemplary embodiment of the present invention.

In FIG. 5A, which represents State 1, the transmitter was operating at high power, and the received signal strength was below the threshold. In this state, the LNA gain was set to a maximum level of 15 dB, and the LNA third order input intercept point was set to a maximum of 15 dB. As can be seen from FIG. 5A, under these conditions, the Receiver Noise Figure (NF) was 7.26 dB, the Receiver Input Intercept Point (IPi) was −5 dBm, the Sensitivity of the receiver was −106.32 dBm, and the Receiver Gain was 62.2 dB.

Figure 5B:
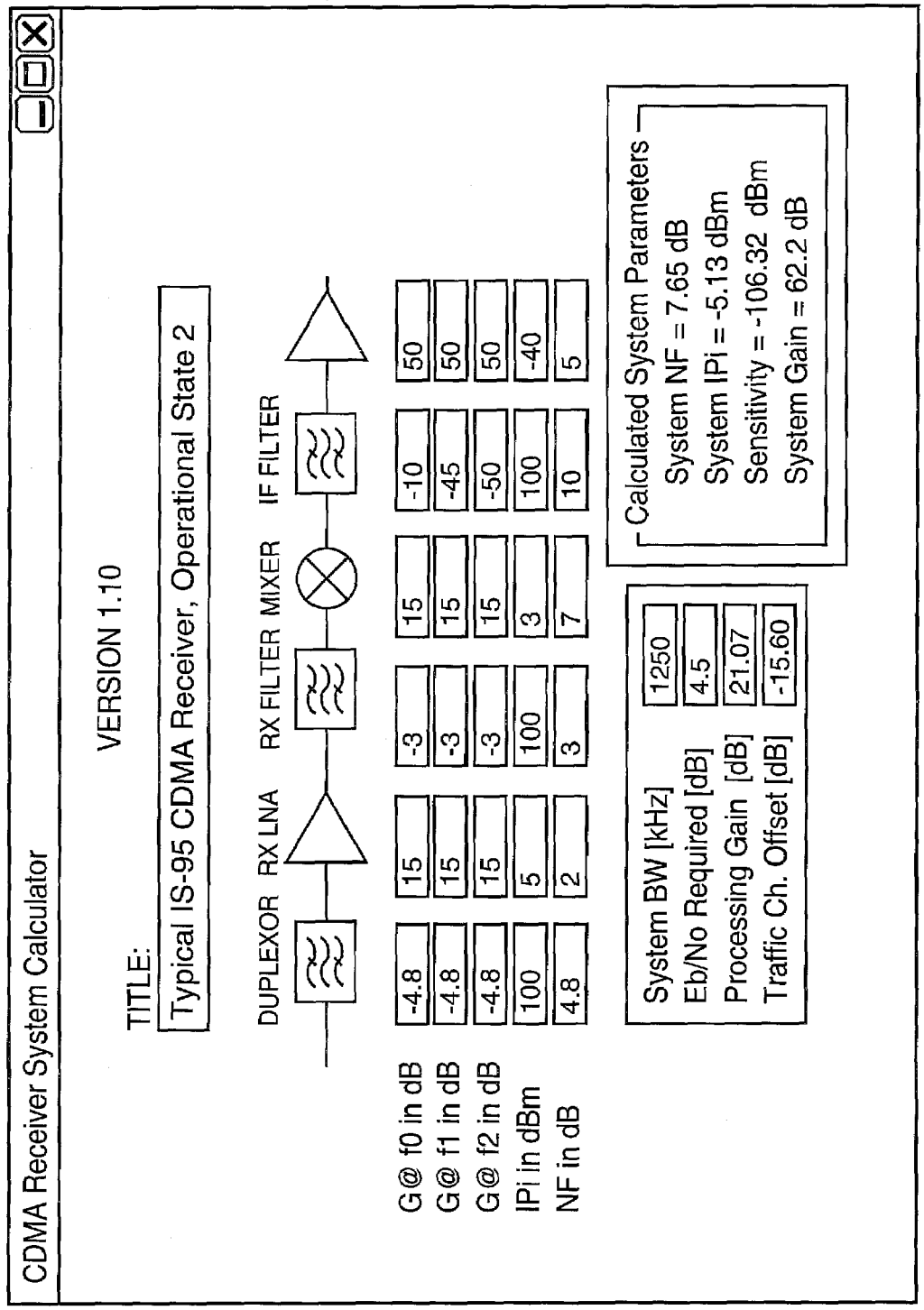

In FIG. 5B, which represents a simulation of State 2, the transmit power level was low, and the received signal strength was below the threshold. In this state, the LNA third order input intercept point was reduced by 10 dB to a minimum level of 5 dB, but the LNA gain remained at the maximum level. As can be seen from FIG. 5B, there was minimal change in the receiver's overall system performance from State 1, with the only change being a reduction in the Receiver IPi to −5.13 dBm.

Figure 5C:
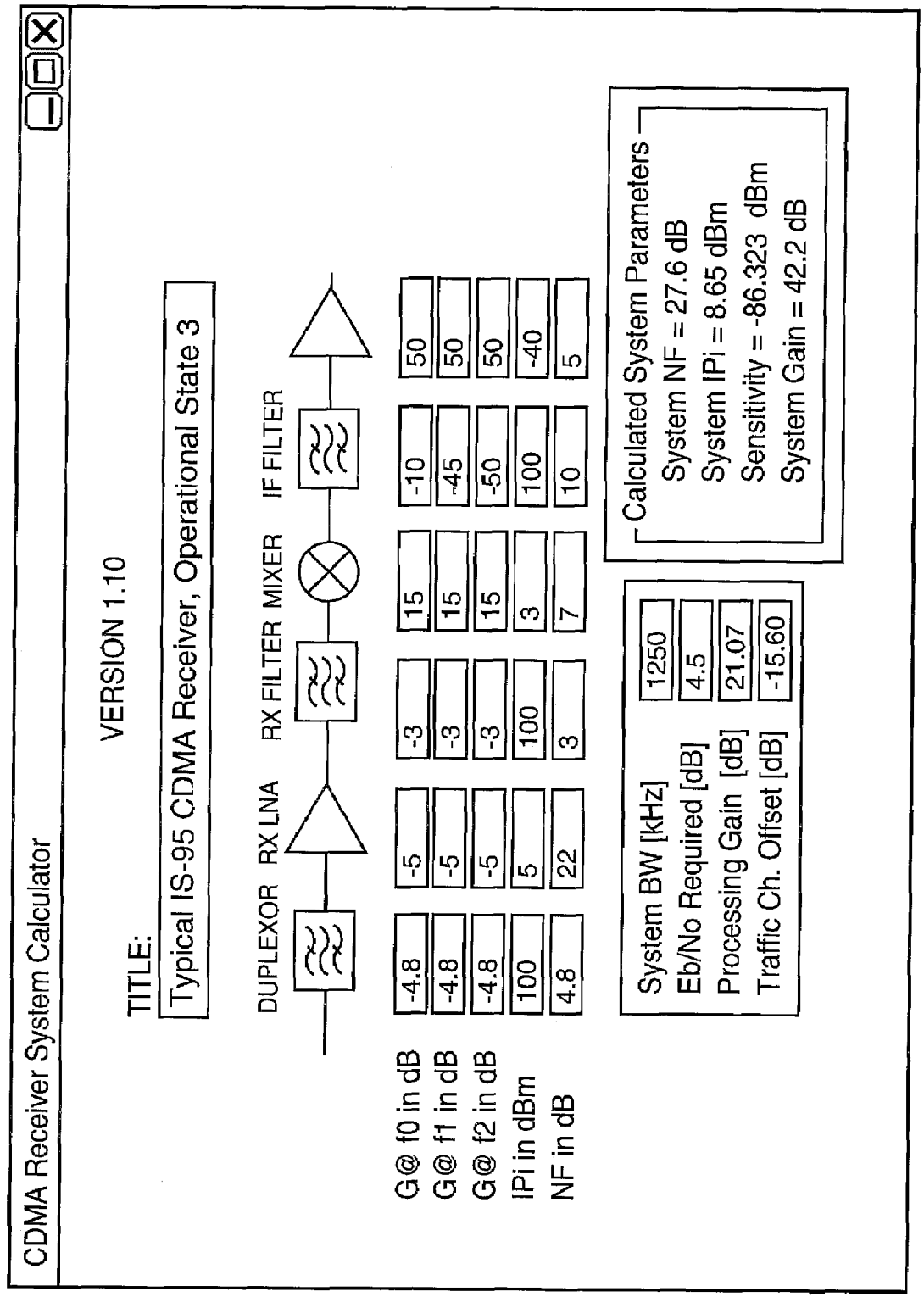

In FIG. 5C, which represents a simulation of State 3, the transmit power level was low, and the received signal strength was above the threshold. The gain of the LNA 155 was reduced by −20 dB to −5 dB, but the LNA third order input intercept point remained at the minimum level. As can be seen from FIG. 5C, reducing the gain of the LNA 155 improved the overall system input intercept point in spite of the LNA 155 operating at a reduced third order input intercept point. In addition, an LNA NF increase from 2 dB to 22 dB was factored in, as result of reducing the LNA gain. Under these conditions, the system NF increased from 7.65 dB to 27.6 dB, the Receiver IPi increased to 8.65 dBm, the Receiver Sensitivity decreased to −86.323 dBm, and the Receiver Gain decreased to 42.2 dB.

Figure 5D:
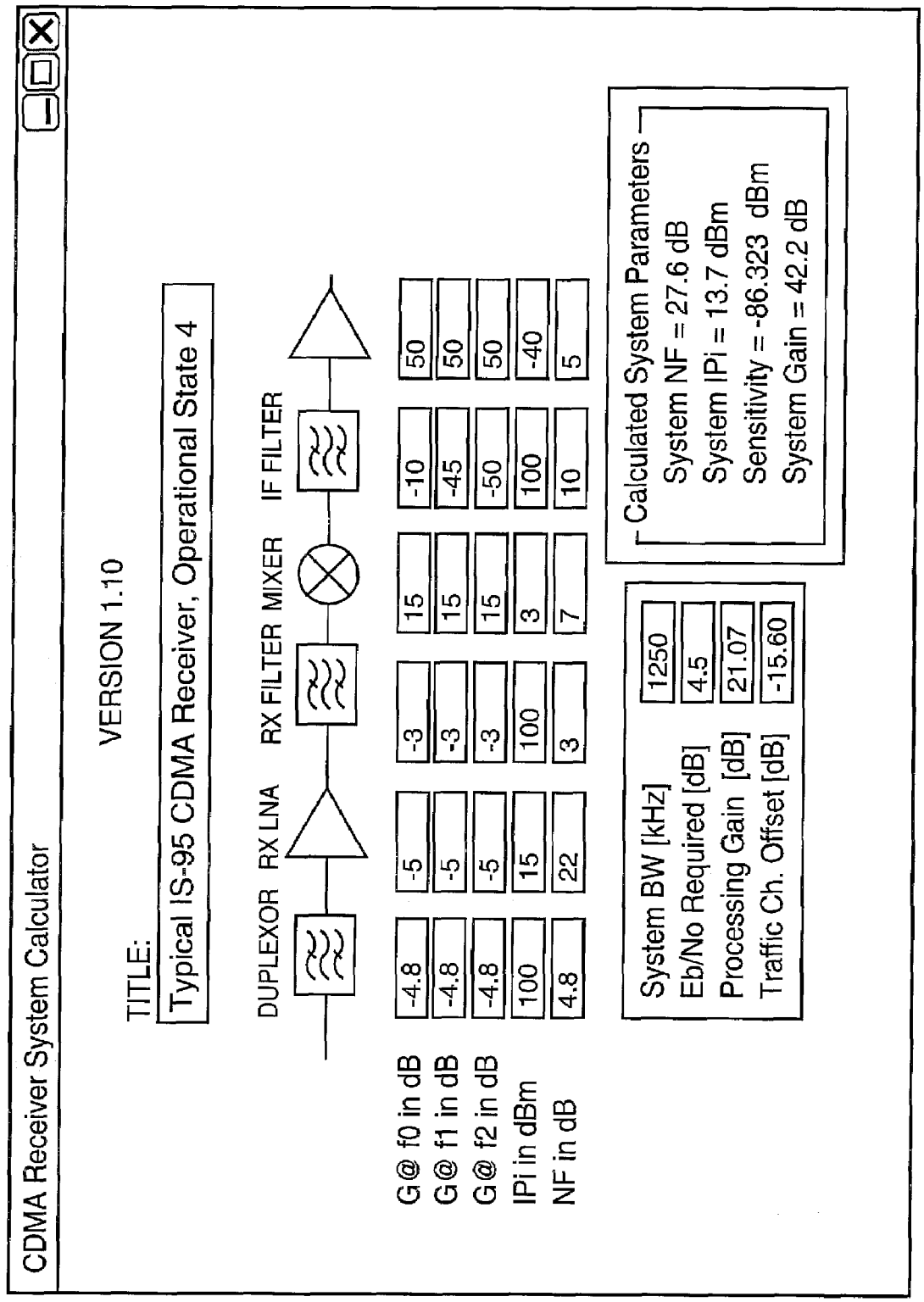

In FIG. 5D, which represents a simulation of State 4, the transmit power level was low, and the received signal strength was above the threshold. The gain of the LNA 155 remained at the minimum level, but the LNA third order input intercept point was increased by 10 dB to 15 dB, in response to an FER exceeding the threshold. As can be seen from FIG. 5D, system performance remained the same as in State 3, except that the Receiver IPi increased from 8.65 dBm to 13.7 dBm. In actual operation, this increase in the receiver input intercept point translates into an improvement in strong handling capacity. Also, assuming that the RX Filter 160 is sufficient to prevent any significant crossmodulation from the Mixer 170, a 10 dB increase in the LNA third order input intercept point corresponds to a 20 dB reduction in the undesired crossmodulation product, effectively increasing the dynamic range of the receiver to this type of interference.

It will be understood that the invention is not limited to the particular embodiments that are described and illustrated above. For example, although the embodiment described above is directed to a CDMA cellular telephone network, the invention is also be applicable to other types of radio telephone systems. The specification contemplates any and all modifications that fall within the scope of the invention as defined by the following claims.

What is claimed is:

1. A method of adjusting the third order input intercept point (IIP3) of a low noise amplifier in a transceiver having a transmitter, a receiver, and a processor, comprising:
   detecting at least high and low transmit powers of the transmitter;
   if the transmit power is high, setting the IIP3 to a maximum level;
   computing, in the processor, an error rate of a signal received by the receiver;
   if the transmit power is low and the error rate exceeds a predetermined threshold, setting the IIP3 to a maximum level; and
   if the transmit power is low and the error rate does not exceed the predetermined threshold, setting the IIP3 to a minimum level.

2. The method of claim 1 wherein the error rate is a Frame Erasure Rate (FER).

3. The method of claim 2 wherein the predetermined threshold is one-half percent.

4. A method of operating a transceiver having a transmitter operative to transmit a signal at a variable transmit power including at least a high and a reduced power level, a receiver operative to receive a signal and including a low noise amplifier having an adjustable gain and an adjustable third order input intercept point (IIP3), and a processor operative to compute an error rate in the signal received by the receiver, comprising:
   detecting a signal strength of the received signal; and
   if the transmitter is transmitting at or above the high power level and the received signal strength is below a signal strength threshold, operating the low noise amplifier at maximum gain and maximum IIP3.

5. The method of claim 4, further comprising:
   detecting an error rate in the received signal, and
   if the transmitter is transmitting at or below the reduced power level and the received signal strength is below the signal strength threshold and the error rate is below an error rate threshold, operating the low noise amplifier at maximum gain and minimum IIP3.

6. The method of claim 5, further comprising:
   if the transmitter is transmitting at or below the reduced power level and the received signal strength is above the signal strength threshold and the error rate is below the error rate threshold, operating the low noise amplifier at minimum gain and minimum IIP3.

7. The method of claim 5, further comprising:
   if the transmitter is transmitting at or below the reduced power level and the received signal strength is above the signal strength threshold and the error rate is above the error rate threshold, operating the low noise amplifier at minimum gain and maximum IIP3.

8. A transceiver, comprising:
   a transmitter operative to transmit a signal at a variable transmit power including at least a high and a low power level;
   a receiver operative to receive a signal and determine its signal strength, and including a low noise amplifier (LNA) having an adjustable gain and an adjustable third order input intercept point (IIP3); and
   a processor operative to adjust the IIP3 of the LNA such that if the transmit power is high and the receiver signal strength is below a signal strength threshold, the processor adjusts the IIP3 of the LNA to a maximum value.

9. The transceiver of claim 8 wherein if the transmit power is high and the receiver signal strength is below a signal strength threshold, the processor additionally adjusts the gain of the LNA to a maximum value.

10. A transceiver, comprising:
   a transmitter operative to transmit a signal at a variable transmit power including at least a high and a low power level;

a receiver operative to receive a signal and determine its signal strength, and including a low noise amplifier (LNA) having an adjustable gain and an adjustable third order input intercept point (IIP3); and a processor operative to compute an error rate in the signal received by the receiver and to adjust the IIP3 of the LNA such that if the transmit power is low and the receiver signal strength is below a signal strength threshold and the error rate is below an error threshold, the processor adjusts the IIP3 of the LNA to a minimum value.

11. The transceiver of claim 10 wherein if the transmit power is low and the receiver signal strength is below a signal strength threshold and the error rate is below the error threshold, the processor additionally adjusts the gain of the LNA to a maximum value.

12. A transceiver, comprising:

a transmitter operative to transmit a signal at a variable transmit power including at least a high and a low power level;

a receiver operative to receive a signal and determine its signal strength, and including a low noise amplifier (LNA) having an adjustable gain and an adjustable third order input intercept point (IIP3); and a processor operative to compute an error rate in the signal received by the receiver and to adjust the IIP3 of the LNA such that if the transmit power is low and the receiver signal strength is above a signal strength threshold and the error rate is below an error threshold, the processor adjusts the IIP3 of the LNA to a minimum value.

13. The transceiver of claim 12 wherein if the transmit power is low and the receiver signal strength is above a signal strength threshold and the error rate is below the error threshold, the processor additionally adjusts the gain of the LNA to a minimum value.

14. A transceiver, comprising:

a transmitter operative to transmit a signal at a variable transmit power including at least a high and a low power level;

a receiver operative to receive a signal and determine its signal strength, and including a low noise amplifier (LNA) having an adjustable gain and an adjustable third order input intercept point (IIP3); and a processor operative to compute an error rate in the signal received by the receiver and to adjust the IIP3 of the LNA such that if the transmit power is low and the receiver signal strength is above the signal strength threshold and the error rate is above an error threshold, the processor adjusts the IIP3 of the LNA to a maximum value.

15. The transceiver of claim 14 wherein if the transmit power is low and the receiver signal strength is above a signal strength threshold and the error rate is above the error threshold, the processor additionally adjusts the gain of the LNA to a minimum value.

* * * * *